US007305253B2

(12) United States Patent
Snyder et al.

(10) Patent No.: US 7,305,253 B2
(45) Date of Patent: Dec. 4, 2007

(54) COMBINATION AUDIO/CHARGER JACK

(75) Inventors: Thomas D. Snyder, Cary, NC (US); Alexander P. de Koster, Cary, NC (US); Chris Eaton, Apex, NC (US)

(73) Assignee: Sony Ericsson Mobile Communications AB (SE)

( * ) Notice: Subject to any disclaimer, the term of this patent is extended or adjusted under 35 U.S.C. 154(b) by 845 days.

(21) Appl. No.: 10/324,441

(22) Filed: Dec. 19, 2002

(65) Prior Publication Data

US 2004/0204185 A1 Oct. 14, 2004

(51) Int. Cl.
*H04B 1/38* (2006.01)
*H04M 1/00* (2006.01)

(52) U.S. Cl. .................... 455/557; 455/569.1; 455/572

(58) Field of Classification Search ................ 455/574, 455/572, 550.1, 557, 569.1
See application file for complete search history.

(56) References Cited

U.S. PATENT DOCUMENTS 5,408,513 A * 4/1995 Busch et al. ................ 455/558
5,775,939 A 7/1998 Brown
5,782,646 A 7/1998 Broadfield et al.
6,006,109 A 12/1999 Shin
6,007,372 A 12/1999 Wood
6,038,457 A * 3/2000 Barkat ..................... 455/556.1
6,152,778 A 11/2000 Dalton
6,163,711 A 12/2000 Juntunen et al.
6,256,520 B1 7/2001 Suzuki
6,424,842 B1 7/2002 Winstead
6,634,896 B1 * 10/2003 Potega ....................... 439/218
2001/0110026 8/2001 Nishijima
2002/0028676 A1 * 3/2002 Kato .......................... 455/434
2004/0198442 A1 * 10/2004 Chan et al. ................. 455/557

FOREIGN PATENT DOCUMENTS

EP 1134958 A1 * 9/2001
FR 2 813 712 3/2002
WO WO 01 43238 6/2001

OTHER PUBLICATIONS

PCT International Search Report dated Mar. 16, 2004.

* cited by examiner

*Primary Examiner*—George Eng
*Assistant Examiner*—Wesley Kim
(74) *Attorney, Agent, or Firm*—Coats & Bennett, P.L.L.C.

(57) ABSTRACT

A personal electronic device includes a multi-function jack that has at least one contact configured for both power and data connections. In an exemplary embodiment, the jack is based on an industry standard audio or barrel jack for compatibility with standard audio or barrel plugs. The shared power and data contact eliminates the need for personal electronic devices, such as mobile telephones, to have separate connectors and/or custom connectors for different types of peripheral devices.

27 Claims, 11 Drawing Sheets

COMBINATION AUDIO/CHARGER JACK

FIELD OF THE INVENTION

The present invention relates to connectors for personal electronic devices and more particularly to multi-function connectors that combine power and data connections in a single connector.

BACKGROUND OF THE INVENTION

The increasing popularity of personal electronic devices, such as mobile telephones, Portable Digital Assistants (PDA), MP3 players, etc., is due in part to their small size and portability. Despite the significant reductions in electronic device size over the past decade, consumers still demand increasingly smaller electronic devices. To address this demand, manufacturers spend considerable resources each year exploring new ways to reduce the size of their electronic devices.

Connectors contribute significantly to the overall size of a personal electronic device. Therefore, size reduction efforts often focus on reducing the size and/or number of connectors. For example, a "system" connector may be used to reduce personal electronic device size. System connectors consolidate the functionality of a variety of connectors into a single, multi-pin connector.

However, there are disadvantages to system connectors. For example, system connectors are typically proprietary to each manufacturer and/or model. As a result, system connectors often cost more to manufacture and maintain, and complicate the interconnection of electronic device peripherals. Often, the only peripherals compatible with a given type of system connector are those peripherals provided by the electronic device manufacturer.

Because of the limitations of system connectors, personal electronic devices typically include additional industry standard jacks for common peripherals, such as audio and charging peripherals. Common audio and charging peripherals use industry standard audio and barrel plugs that are compatible, respectively, with industry standard audio and barrel jacks. As a result, personal electronic device users may use a variety of common peripherals, such as headsets, hands-free adapters, battery chargers, etc., with their electronic devices. However, each jack requires significant space in the personal electronic device. For example, including one audio jack (for audio peripherals) and one barrel jack (for charging peripherals) might increase a mobile telephone's size by more than 7%. Thus, providing personal electronic devices with industry standard audio and charging jacks ensures compatibility with a broad range of peripherals but undesirably increases personal electronic device size.

SUMMARY OF THE INVENTION

The present invention comprises a method and apparatus for combining audio or other data with power in a single, standard connector that includes at least one shared function contact. In an exemplary embodiment, a personal electronic device, such as a mobile telephone, includes a shared function jack with at least one shared contact used for both power and data functions. It will be understood by those skilled in the art that the present invention is also applicable to other personal electronic devices, such as computers, personal data assistants, MP3 players, etc. Preferably, the shared function jack is an industry standard form factor, such as one of the standardized audio or barrel jacks commonly used in personal electronic devices. As used herein, the term "data" should be understood to encompass both digital data as well as analog data, including audio signals, video signals, etc.

In exemplary applications, the shared function jack includes at least two contacts, with at least one of these contacts configured for both data and power functions. With this arrangement, a first contact serves as a ground contact and a second contact serves as a shared function contact for a data circuit and a power circuit, both of which are included in the personal electronic device.

The shared function contact may directly or indirectly couple to the power and data circuits. For example, in a first exemplary embodiment, power and data circuits couple directly to one or more shared contacts on the shared function jack. With this arrangement, dc blocking may be used to block dc power signals from the data circuit. In addition, filtering may be used to prevent data signals, e.g., alternating current (ac) signals, from interfering with the power circuit while allowing simultaneous application of power and data signals to the shared contact(s) in the connector. As used herein, the term "ac" connotes a time varying signal, and includes audio, video, etc.

In a second exemplary embodiment, a switch may alternately connect the shared contact to either the data circuit or the power circuit. For example, the switch may connect the shared contact to the data circuit upon sensing an ac data signal or to the power circuit upon sensing a dc power signal. Alternatively, the switch may connect the shared contact to the power or data circuits upon sensing a particular connector configuration.

According to the present invention, peripheral devices, such as headsets, chargers, etc., all may use the same standard plug, such as an audio plug or a barrel plug, for use with the shared function jack included in the personal electronic device. Those skilled in the art will understand that the present invention may also be implemented with other standard connectors.

DETAILED DESCRIPTION OF THE INVENTION

The following describes an exemplary combined power and data jack providing, for example, combined power and data connections in a mobile telephone or other personal electronic devices. As discussed above, multiple connectors affect the size and cost of the personal electronic device. The combination power and data jack of the present invention may reduce the size and cost of the electronic device by reducing the number of connector jacks in the electronic device. Further, when the shared function jack is a standardized jack, such as an industry standard audio or barrel jack, the electronic device will be compatible with a wide range of standard peripheral devices.

Figure 1:
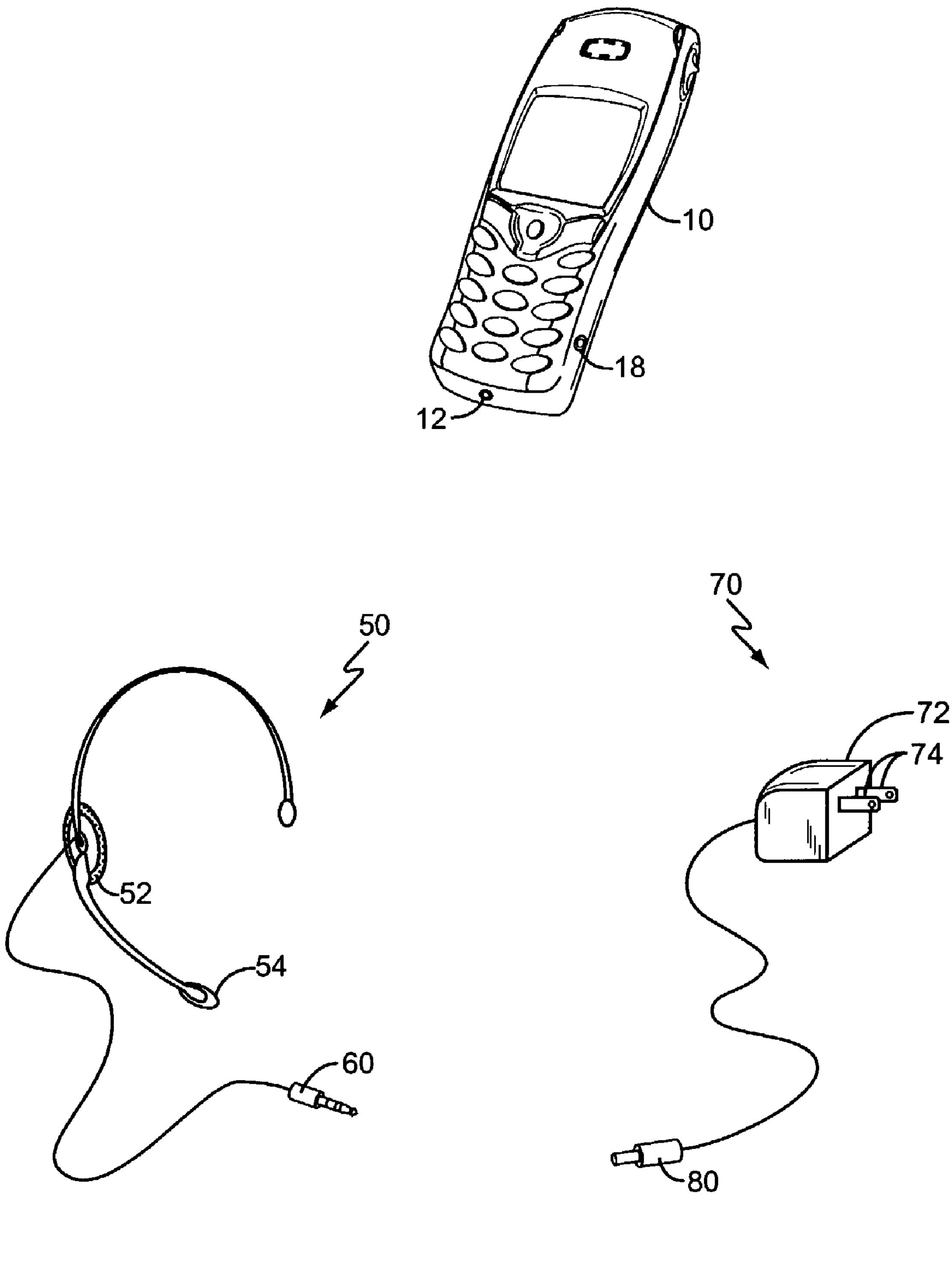
FIG. 1 PRIOR ART
FIG. 1 illustrates a conventional mobile telephone with audio and charging peripherals.

Referring now to the drawings, FIG. 1 illustrates a conventional mobile telephone 10, shown with conventional headset 50 and charger 70. The headset 50 includes speaker 52 and microphone 54. The cord of the headset 50 terminates in an audio plug 60 that inserts into a corresponding audio jack 12 of the mobile telephone 10. The charger 70 includes an ac/dc adapter 72 with a plug 74 that inserts into a conventional wall outlet. The cord of charger 70 terminates in a barrel plug 80 that inserts into a corresponding barrel jack 18 in the mobile telephone 10. While charger 70 is illustrated as a "wall" type of charger, it will be understood by those skilled in the art that the charger 70 could also be of any other known configuration, such as a dc/dc auto adaptor. As noted above, the use of separate standardized jacks 12, 18 undesirably increases the mobile telephone's size and cost.

Figure 2A:
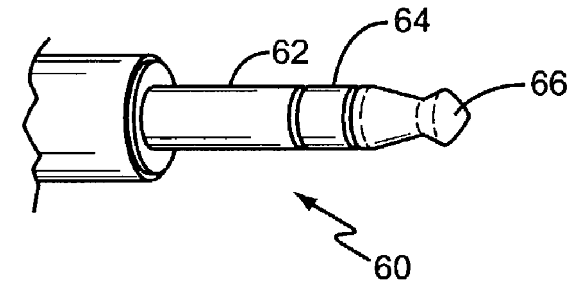
FIG. 2A PRIOR ART
FIG. 2*a* illustrates a conventional 3-contact audio plug.
Figure 2B:
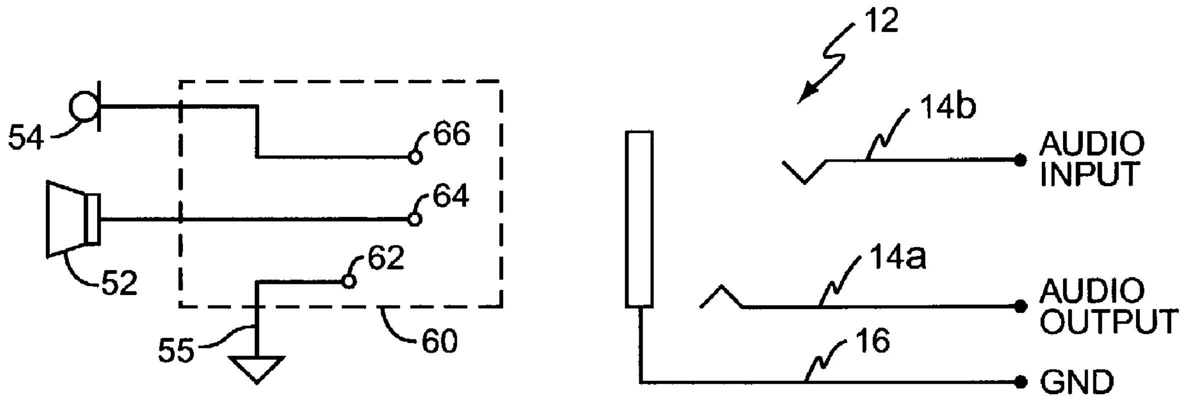
FIG. 2B PRIOR ART
FIG. 2*b* illustrates a conventional interconnection for a 3-contact audio plug with a 3-contact audio jack.

FIGS. 2A and 2B illustrate the audio plug 60 and audio jack 12 in more detail. Audio plug 60 is a standard three-contact audio plug having three segments: a sleeve 62, a ring 64, and a tip 66. For a conventional headset 50, tip 66 electrically connects to the microphone 54, ring 64 electrically connects to speaker 52, and sleeve 62 electrically connects to a peripheral ground 55. The audio jack 12 includes corresponding contacts 14*a*, 14*b*, and 16. When the audio plug 60 is plugged into audio jack 12, tip 66 connects to audio contact 14*b* of jack 12, ring 64 connects to contact 14*a*, and sleeve 62 connects to ground contact 16.

Figure 3A:
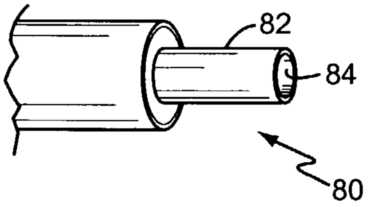
FIG. 3A PRIOR ART
FIG. 3*a* illustrates a conventional 2-contact barrel plug.
Figure 3B:
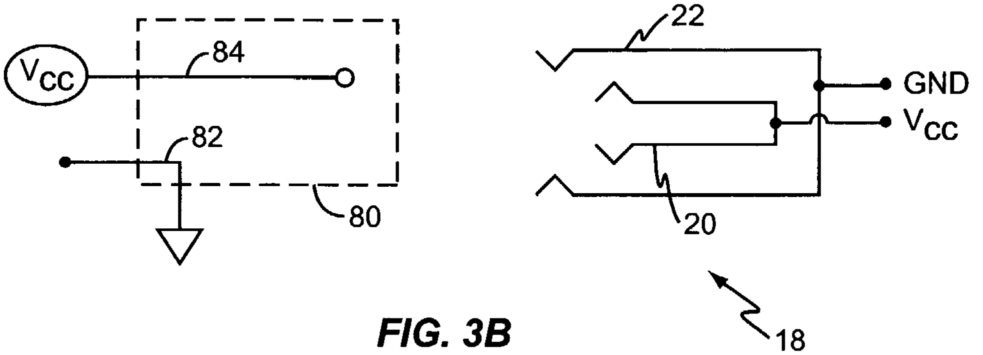
FIG. 3B PRIOR ART
FIG. 3*b* illustrates a conventional interconnection for a 2-contact barrel plug with a 2-contact barrel jack.

FIGS. 3A and 3B illustrate the barrel plug 80 and barrel jack 18. The barrel plug 80 includes an outer contact 82 and an inner contact 84 that typically connect to a power circuit in charger 70. The barrel jack 18 includes corresponding contacts 20 and 22. When 2-contact barrel plug 80 is plugged into 2-contact barrel jack 18, outer contact 82 connects to ground contact 22 and inner contact 84 connects to power contact 20.

Figure 4A:
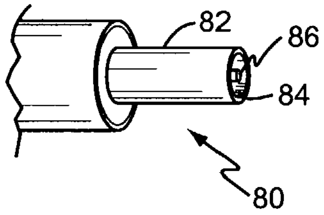
FIG. 4A PRIOR ART
FIG. 4*a* illustrates a conventional 3-contact barrel plug.
Figure 4B:
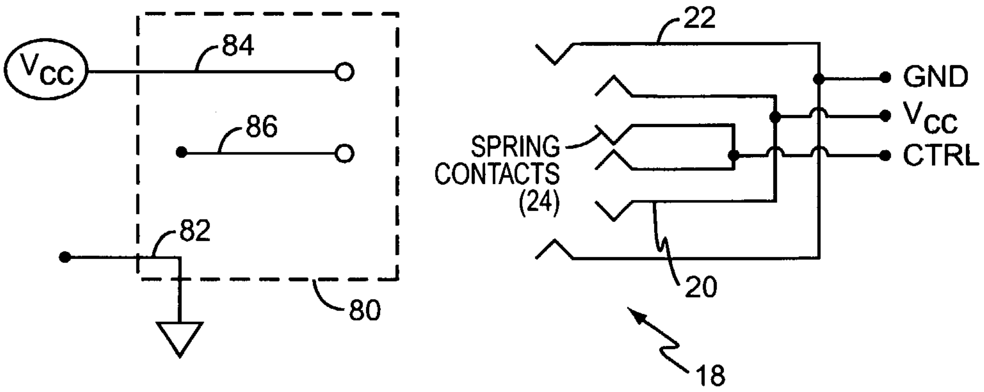
FIG. 4B PRIOR ART
FIG. 4*b* illustrates a conventional interconnection for a 3-contact barrel plug with a 2-contact barrel jack.

Alternatively, charging peripheral 70 may use a 3-contact barrel plug 80, as shown in FIGS. 4A and 4B. A 3-contact barrel plug 80 includes an additional pin contact 86, typically centered coaxially within the plug's barrel. In addition to the connections made with the 2-contact barrel connector, pin 86 connects to or otherwise mates with spring contact 24. Pin contact 86 may serve, for example, as a control pin for indicating to mobile telephone 10 that a charger 70 is plugged into the mobile telephone 10. For example, spring contact 24 may operate as a closed-loop circuit when nothing is plugged into jack 18. When the barrel plug 80 is plugged into the barrel jack 18, pin 86 separates the elements of the spring contact 24. If pin 86 is conductive, pin 86 effectively maintains the closed-loop circuit. Alternatively, if pin 86 is non-conductive, spring contact 24 is effectively an open-loop circuit. Circuitry within the mobile telephone 10 may detect the state of the spring contact 24 to determine that a power peripheral is plugged into jack 18.

Figure 5:
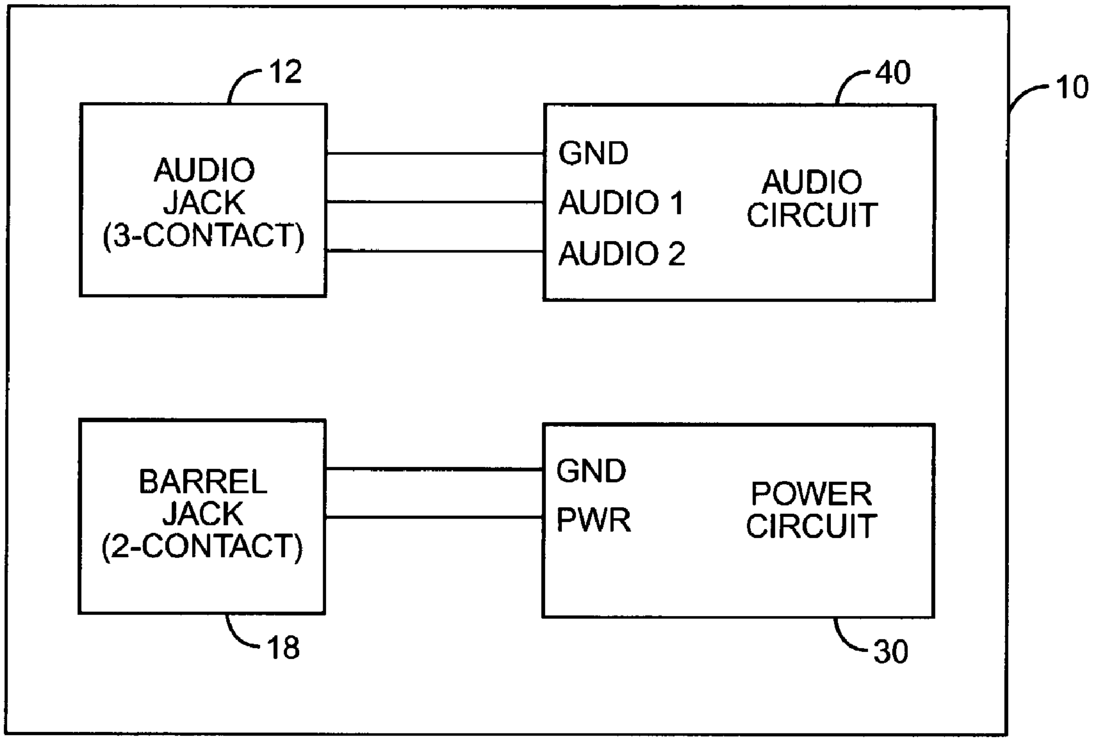
FIG. 5 PRIOR ART
FIG. 5 illustrates a conventional interconnection between an audio circuit and an audio jack and a power circuit and a barrel jack.

FIG. 5 illustrates conventional circuitry for a mobile telephone 10 or other personal electronic device. The circuit includes a power circuit 30, an audio circuit 40, a barrel jack 18 and an audio jack 12. As shown in FIG. 5, the interconnections between audio jack 12 and audio circuit 40 are independent of the interconnections between barrel jack 18 and power circuit 30. Other conventional mobile telephone components and interconnections well understood in the art are not critical to the understanding of the invention disclosed herein. Therefore, for simplicity, these components and interconnections are not shown.

Figure 6:
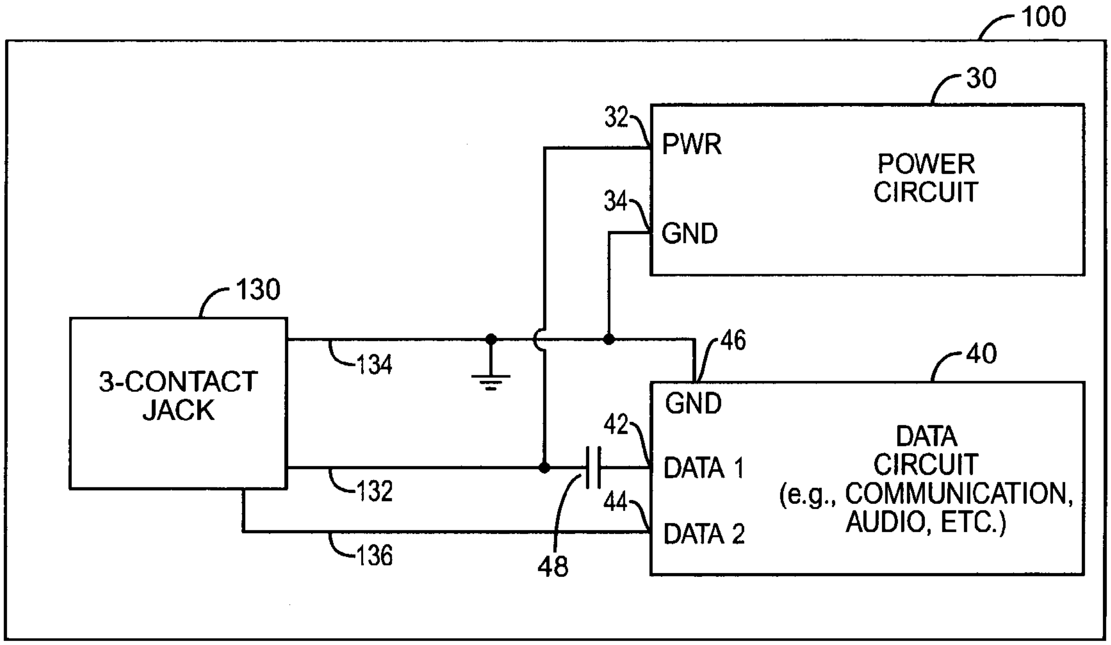
FIG. 6 illustrates an exemplary interconnection between a 3-contact jack and power and data circuits.

The present invention reduces the number of connectors used in an improved personal electronic device, such as a mobile telephone 100 (FIG. 6) by providing a single jack for both data and power. In this embodiment, "data circuit" 40 connotes a circuit within a mobile telephone 100 involved in transferring and/or receiving data. Such a circuit may include a communication circuit, an audio circuit, a video circuit, etc., responsible for transferring and/or receiving communication signals, audio signals, video signals, etc. Also in this embodiment, power circuit 30 comprises a power management circuit, such as a battery charging circuit FIG. 6 illustrates an exemplary circuit according to the present invention including a power circuit 30, a data circuit 40, and a shared function jack 130. The circuit may comprise a part of mobile telephone 100 or other personal electronic device. Jack 130 may be adapted to receive a conventional audio plug 60 as shown in FIGS. 2A and 2B, or a barrel plug 80 as shown in FIGS. 4A and 4B. Jack 130 includes a shared power/data contact 132, a ground contact 134, and a data contact 136. Ground contact 134 connects with data and power grounds 34 and 46. The shared power/audio contact 132 connects to power connection 32 of the power circuit 30 and to a first data connection 42 of data circuit 40. The second data contact 136 connects to a second data connection 44 of data circuit 40.

The jack 130 is adapted to receive plugs from both a data peripheral, such as a headset, and a power peripheral, such as a charger. When a power peripheral, such as a charger or other power adapter, is plugged into jack 130, capacitor 48 blocks dc power from reaching the data circuit 40. If necessary, power circuit 30 may include filters (not shown) to prevent any alternating current (ac) signal present on the shared power/audio contact 132 from interfering with the power circuit 30.

Figure 7A:
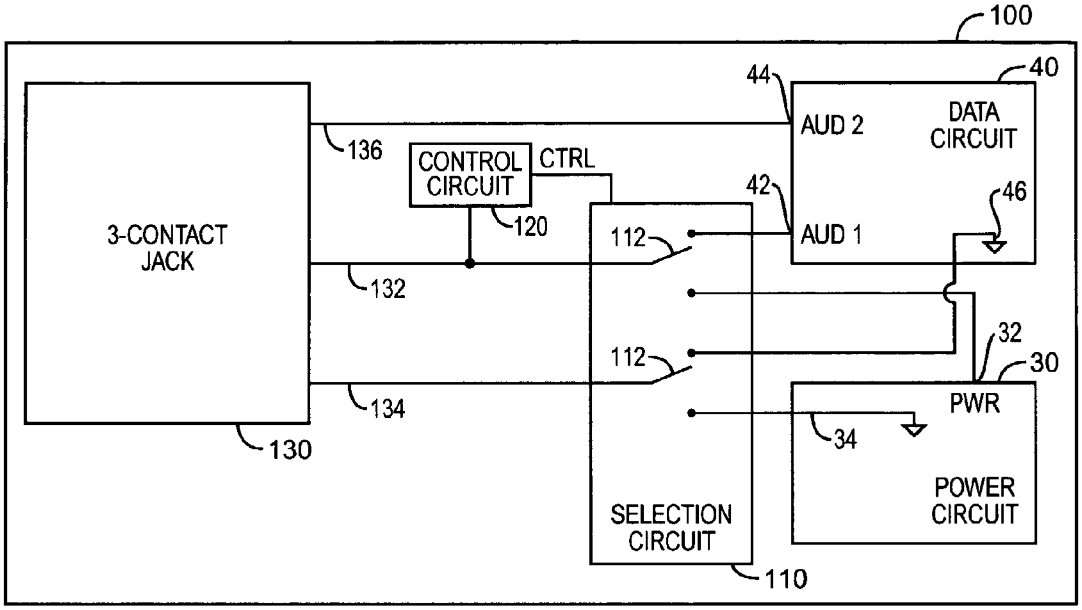
FIG. 7*a* illustrates another exemplary interconnection, including control and switching circuits, between a 3-contact jack and power and data circuits.

FIG. 7A illustrates another exemplary circuit according to the present invention including a control circuit 120 and a selection circuit 110. In some embodiments, the control circuit 120 may incorporate the selection circuit 110. Control circuit 120 controls the selection circuit 110 based on sensing a signal condition of one or more contacts in jack 130. Thus, control circuit 120 may configure the selection circuit 110 depending on the type of peripheral (e.g. headset, battery charger, power adapter, etc.) plugged into the jack 130. More particularly, in one embodiment, the control circuit 120 senses ac and dc signals on the shared power/audio contact 132 and generates a control signal to control the selection circuit 110. In another exemplary embodiment, the control circuit 120 may sense a short or open circuit on one or more contacts.

The selection circuit 110 includes selection switches 112 that alternately connect shared power/audio contact 132 and ground contact 130 to either the power circuit 30 or the data circuit 40. The selection switches 112 may be electrical, mechanical, opto-electronic, or any other switching means. In a first configuration, the selection switches 112 connect the shared power/audio contact 132 to a power connection 32 of the power circuit 30 and connect the ground contact 134 to power ground 34. In a second configuration, selection switches 112 connect the shared power/audio contact 132 to a first audio connection 42 of the data circuit 40 and connect the ground contact 134 to the audio ground 46.

Figure 7B:
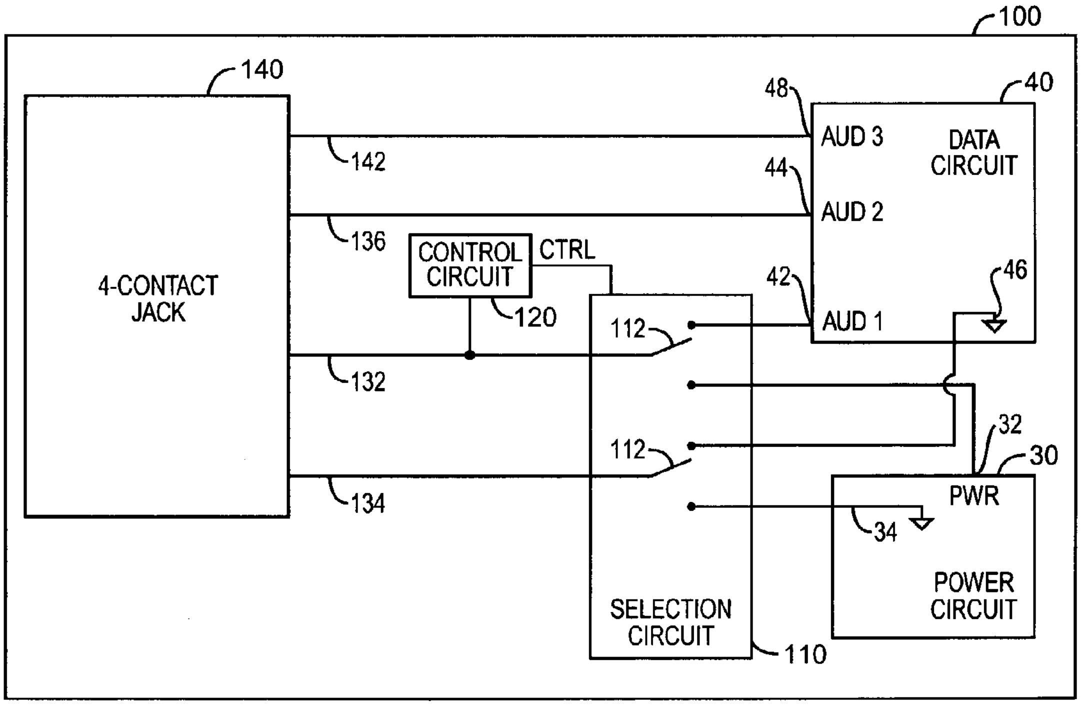
FIG. 7*b* illustrates an exemplary interconnection, including control and switching circuits, between a 4-contact jack and power and data circuits.

FIG. 7B illustrates another exemplary circuit according to the present invention using a four-contact jack. The four contact jack is essentially the same as the three-contact jack of FIG. 7A with the addition of third data or control contact 142. In one embodiment, third audio contact 142 connects to a third audio input 48 of the data circuit 40. The provision of an extra audio contact 142 permits both an audio input (e.g. microphone) and a stereo output.

Figure 8A:
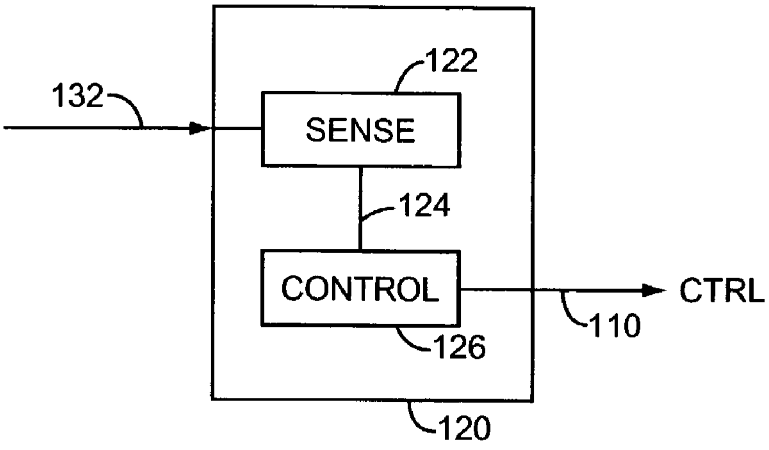
FIG. 8*a* illustrates an exemplary control circuit.
Figure 8B:
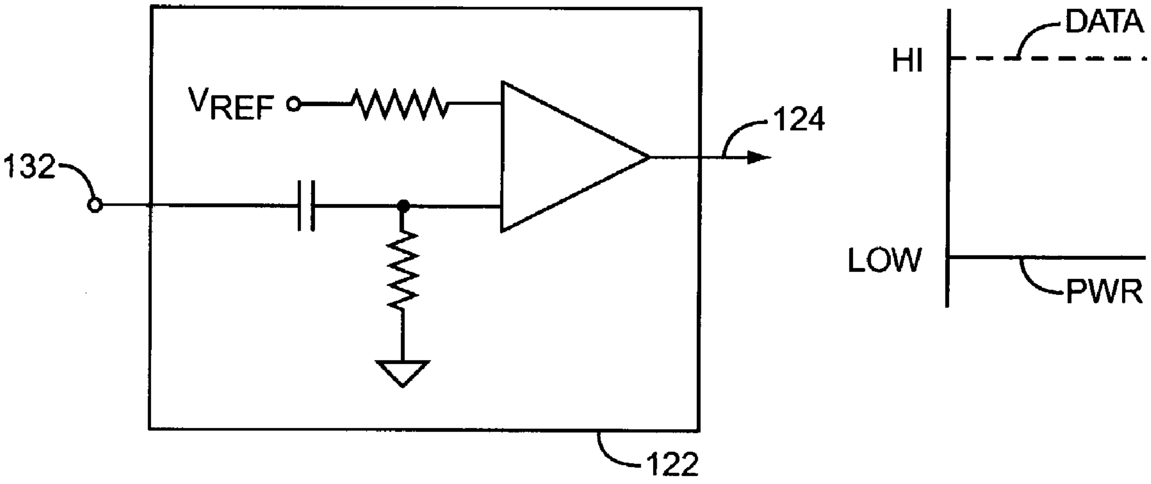
FIG. 8*b* illustrates an exemplary sensing circuit of the control circuit in FIG. 7*a*.

FIGS. 8A and 8B illustrate an exemplary control circuit 120 in more detail. Control circuit 120 includes a sensing circuit 122 and control logic 126. Sensing circuit 122 detects the signal type and/or level on the shared power/audio contact 132. In one exemplary embodiment, sensing circuit 122 includes a comparator having a first input connected to a voltage reference and a second input connected to the shared power/audio contact 132. The comparator output is coupled to the output of the sensing circuit 122. If a dc signal is present on the shared power/audio contact 132, the output 124 to the sensing circuit 122 is a low signal. Alternatively, if an ac signal is present on the shared power/audio contact 132, the output 124 of the sensing circuit 122 is a high signal. The output 124 of the sensing circuit 122 is applied to control logic 126, which generates a control signal for selection circuit 110 responsive to the output 124 of the sensing circuit 122. Of course, the sensing circuit illustrated in FIG. 8B is simply one approach to signal sensing and is only shown here for illustration. Various other sensing circuits known in the art may also be used.

Figure 9A:
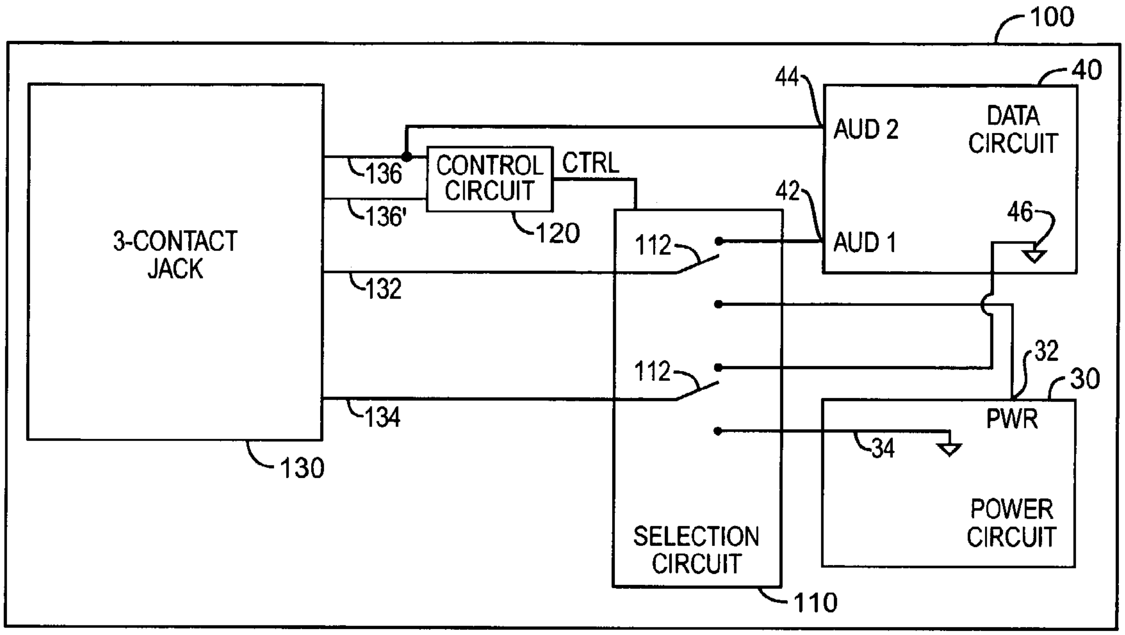
FIG. 9*a* illustrates another exemplary interconnection, including control and switching circuits, between a 3-contact jack and power and data circuits.
Figure 9B:
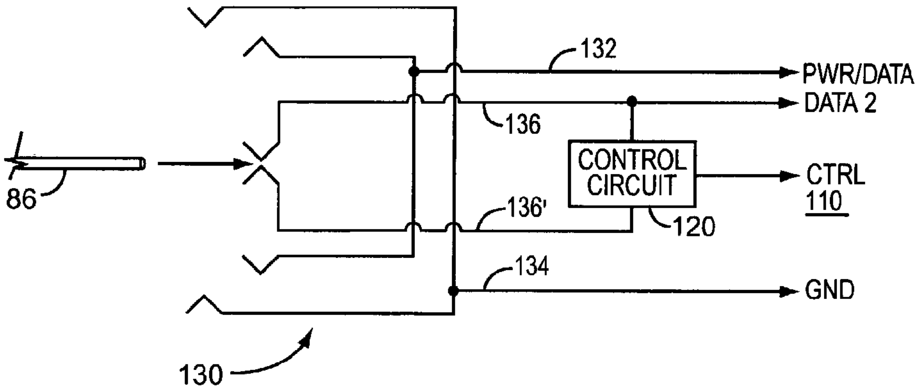
FIG. 9*b* illustrates another exemplary sensing scheme.

According to another embodiment of the present invention, illustrated in FIGS. 9A and 9B, the connector configuration may indicate the signal type to control circuit 120. For example, jack 130 may comprise a barrel jack with a spring contact 136 that forms an open-loop circuit when pin 86 electrically separates elements of the spring contact 136. An open-loop circuit may, for example, indicate that a charger 70 or dc adapter is plugged into the mobile telephone 100. Alternatively, spring contact 136 may form a closed-loop circuit when pin 86 electrically connects contact 136 to contact 136'. A closed-loop circuit may indicate that an audio, video, or other data peripheral is plugged into the mobile telephone 100. Control circuit 120 then generates a control signal for selection circuit 110 responsive to the state of the spring contact circuit 136 and 136'.

In some implementations, it is beneficial to isolate the data ground from the power ground. As illustrated in FIGS. 7A, 7B, and 9A, the selection circuit 110 may selectively couple the ground contact 134 to a power ground contact 34 on the power circuit 30 or to a data ground contact 46 on the data circuit 40. However, it will be understood by those skilled in the art that the ground contact 134 could connect directly to both the data circuit 40 and the power circuit 30.

Figure 10A:
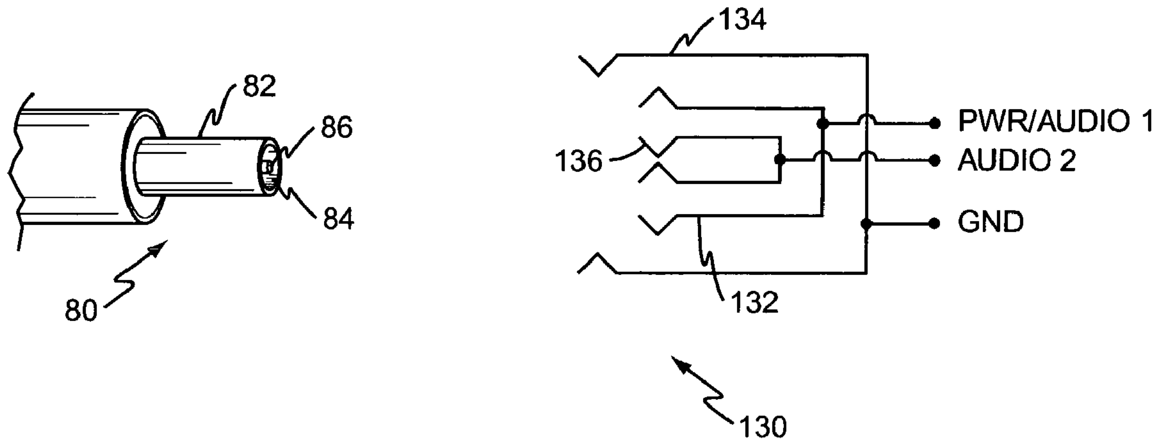
FIG. 10*a* illustrates an exemplary interconnection between a 3-contact barrel plug and a 3-contact barrel jack.
Figure 10B:
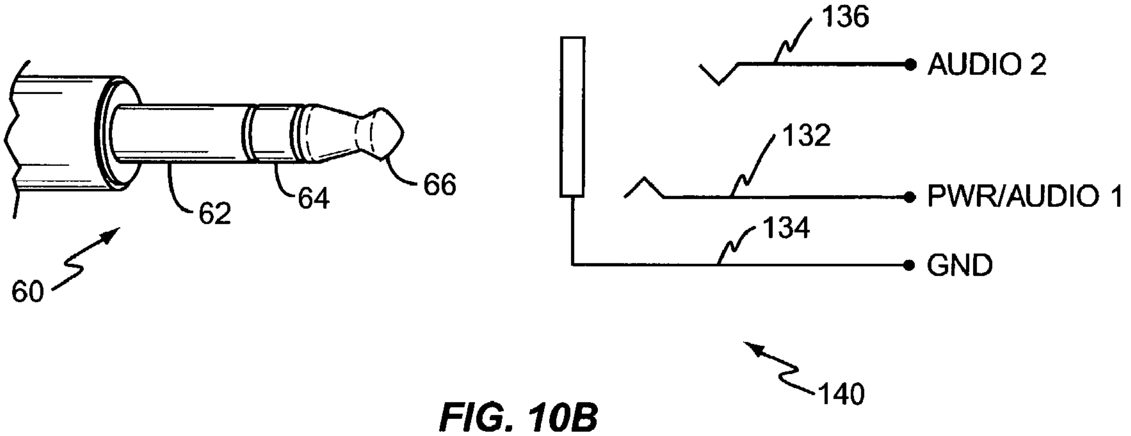
FIG. 10*b* illustrates an exemplary interconnection between a 3-contact audio plug and a 3-contact audio jack.

The present invention contemplates that a single standard plug will be used for both audio devices and power devices, thereby allowing a single jack to be used in the improved mobile telephone 100 or other personal electronic device. The plug may comprise an audio plug or a barrel plug, or any other known type of plug. FIGS. 10A and 10B illustrate exemplary plugs that could be used with the present invention. FIG. 10A illustrates an exemplary 3-contact barrel connector including an outer contact 82, an inner contact 84, and a pin 86. When plugged into a 3-contact barrel jack 130 of the present invention, outer contact 82 connects to a ground contact 134, inner contact 84 connects to a shared power/audio contact 132, and pin 86 mates with a spring contact 136. Those skilled in the art will understand that various other configurations may also be used with the present invention. For example, the shared power/audio contact could be pin 86. The signal on the shared power/audio contact 132 of barrel jack 130 may be a power signal, a data signal, such as an audio signal, or a power and a data signal, depending on the type of peripheral plugged into the barrel jack 130. When plug 80 is used in an audio peripheral, such as a headset with a single speaker and a microphone, the outer contact 82 may connect to a ground, the inner contact 84 may connect to the speaker, and the pin 86 may connect to the microphone. If the headset does not include a microphone, but instead has two speakers, the pin 86 may connect to one of the speakers and the inner contact 84 may connect to the other. When used with a battery charger or other power peripheral, the outer contact 82 of the plug may connect to ground and the inner contact 84 may connect to power.

FIG. 10B illustrates an exemplary 3-contact audio connector 60 including a sleeve 62, a ring 64, and a tip 66. When plugged into a 3-contact audio jack 140, sleeve 62 connects to a ground contact 134, the ring connects to the shared power/audio contact 132, and the tip 66 connects to a second audio contact 136. Again, the signal on the shared power/audio contact 132 of audio jack 140 may be a power signal, a data signal, such as an audio signal, or a power and data signal, depending on the type of appliance plugged into the audio jack 140.

When the plug 60 is used in an audio peripheral, such as a headset with a single speaker and a microphone, the sleeve 62 may connect to a ground, the ring 64 may connect to the speaker, and the pin tip 66 may connect to the microphone. If the headset does not include a microphone, but instead has two speakers, the tip 66 may connect to one of the speakers and the ring 64 may connect to the other.

When the plug 60 is used with a battery charger or other power peripheral, the sleeve 62 of the plug 60 may connect to ground and the ring 64 may connect to power. The tip 66 may not carry any signal. Those skilled in the art will understand that the above connections are for illustrative purposes only. Other embodiments may use any contact on the connector, such as the pin, as the shared power/audio contact.

Figure 11:
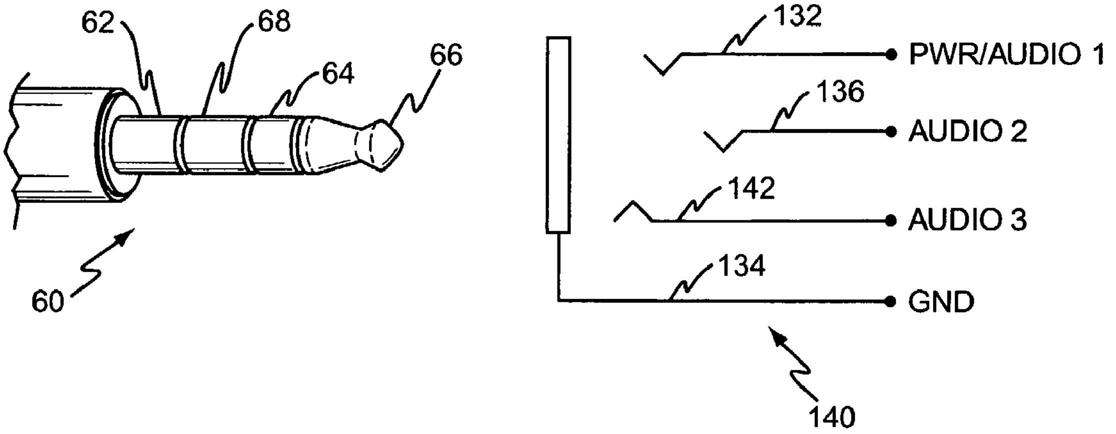
FIG. 11 illustrates an exemplary interconnection between a 4-contact audio plug and a 4-contact audio jack.

Those skilled in the art will understand that the present invention does not limit the number of connector contacts. For example, FIG. 11 illustrates an exemplary 4-contact audio plug 60 that is essentially the same as the three-contact audio plug of FIG. 10B with a second ring 68. The plug 60 of FIG. 11 may be used, for example, in a headset with two speakers and a microphone. Ring 68 may connect to one of the speakers while ring 64 connects to the other. As with the 3-contact connector, the shared power/audio contact 132 of audio jack 140 is operative to receive either a power signal, a data signal, such as an audio signal, or a power and a data signal from first ring 64. Further, the second ring 68 connects to a second audio contact 142 operative to receive either a second data signal, such as an audio signal resulting for a second speaker.

Figure 12:
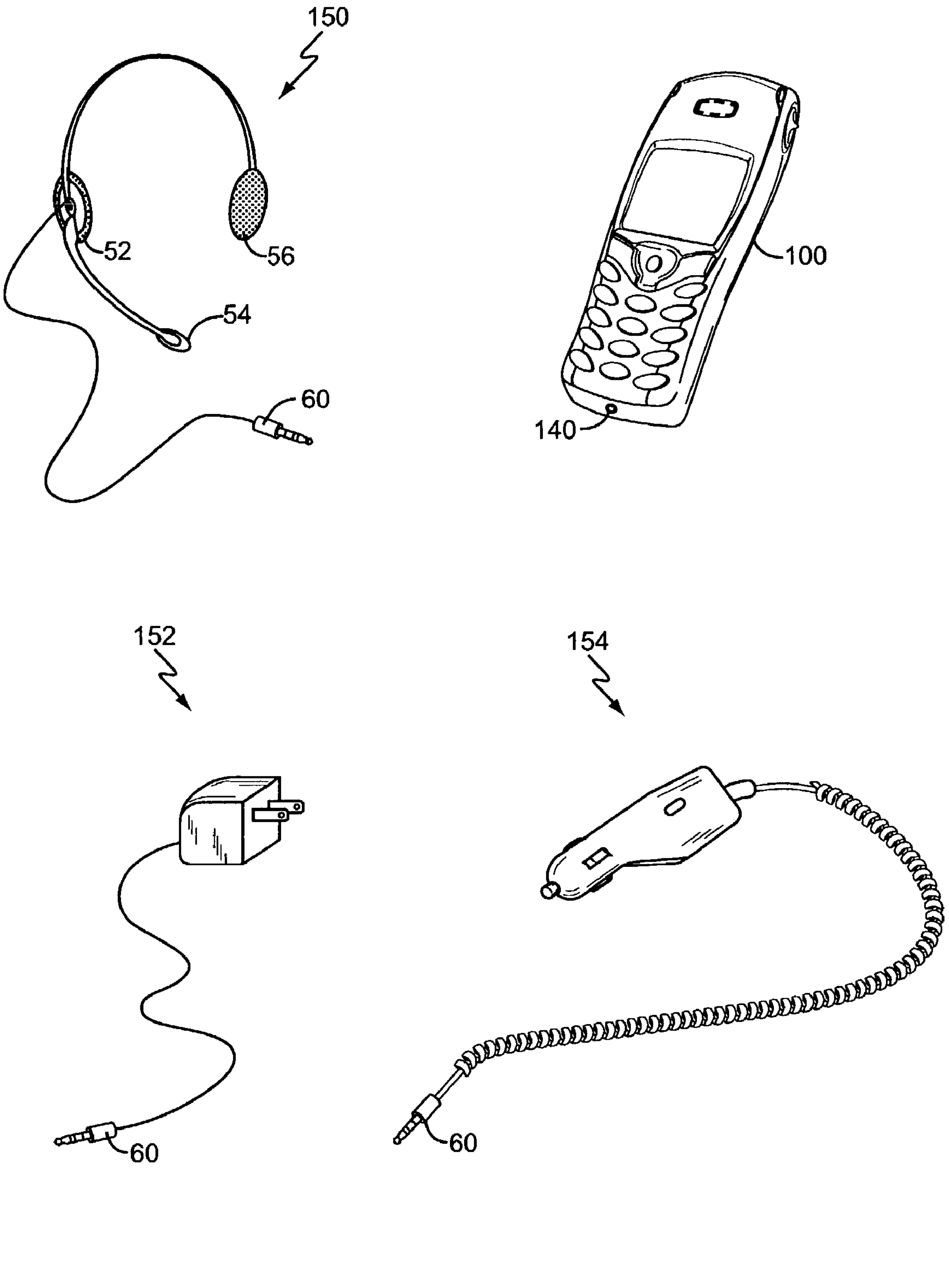
FIG. 12 illustrates an exemplary mobile telephone including an audio jack to connect to audio and charging peripherals with audio plugs.
Figure 13:
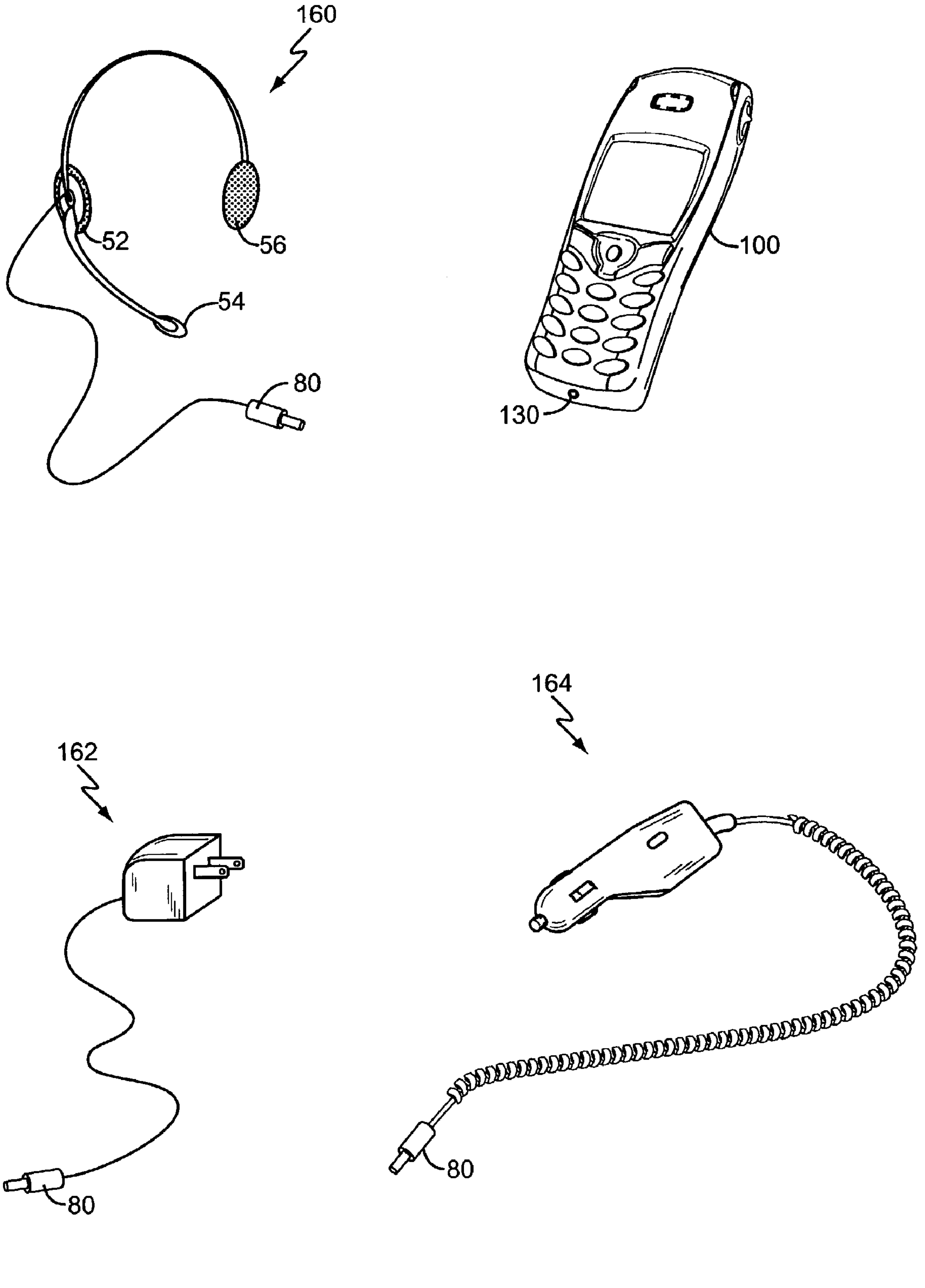
FIG. 13 illustrates an exemplary mobile telephone including a barrel jack to connect to audio and charging peripherals with barrel plugs.

According to the present invention, multiple common peripheral devices, such as headset 150 and/or chargers 152 and 154, may be compatible with a single jack on mobile telephone 100 or other personal electronic device. The mobile telephone 100 may include a standard audio jack 140 as shown in FIG. 12. Alternatively, as illustrated in FIG. 13, mobile telephone 100 may include a barrel jack 130 compatible with a plurality of common peripheral devices, such as headset 160 and/or chargers 162 and 164, using a standard barrel plug 80.

The foregoing description and drawings describe and illustrate exemplary embodiments of the present invention in detail. Those skilled in the art will understand that the present invention is not limited to standard audio or barrel connectors. Those skilled in the art will also appreciate that the inventive connector may comprise more than one multifunction contact. Therefore, the present invention embraces all changes and modifications that come within the meaning and equivalency range of the appended claims.

What is claimed is:

1. An electronic device comprising:

a power circuit;

a data circuit;

a connector for connecting-external power and data peripherals to said power and data circuits, said connector comprising:

a shared first contact selectively coupled either to said power circuit or to said data circuit; and a second contact for coupling to a ground of said electronic device; and a control circuit configured to sense a peripheral type based on whether a power peripheral or a data peripheral is connected to the connector, and further configured to couple said first contact either to said power circuit or to said data circuit based on the sensed peripheral type.

2. The electronic device of claim 1 wherein said data circuit comprises at least one of an audio circuit and a video circuit.

3. The electronic device of claim 1 wherein said power circuit includes a battery charging circuit.

4. The electronic device of claim 1 wherein said connector comprises a barrel jack operative to receive a barrel plug, said first contact configured to connect with a first connection of said barrel plug and said second contact configured to connect with a second connection of said barrel plug.

5. The electronic device of claim 1 wherein said connector comprises an audio jack operative to receive an audio plug, said first contact configured to connect with a first segment of said audio plug and said second contact configured to connect with a second segment of said audio plug.

6. The electronic device of claim 1 further comprising a selection circuit having a selection switch to couple said first contact either to said power circuit or said data circuit based on the sensed peripheral.

7. The electronic device of claim 6 wherein said selection circuit couples said second contact either to said power circuit or said data circuit based on the sensed peripheral type.

8. The electronic device of claim 6 wherein the control circuit senses the peripheral type by sensing a signal condition of one or more contacts of said connector.

9. The electronic device of claim 8 wherein said connector further comprises a third contact coupled to said control circuit, and wherein said control circuit senses said signal condition on said third contact.

10. The electronic device of claim 8 wherein said signal condition comprises an electrical open or an electrical short on said one or more contacts of said connector.

11. The electronic device of claim 8 wherein said signal condition comprises a signal characteristic of the peripheral device connected to said electronic device via said connector.

12. The electronic device of claim 11 wherein said control circuit senses said signal characteristic as one of a dc signal and an ac signal.

13. The electronic device of claim 1 wherein said connector further comprises at least one of a third contact and a fourth contact for coupling to said data circuit.

14. The electronic device of claim 1 wherein said electronic device comprises a mobile communication device.

15. The electronic device of claim 1 wherein said electronic device comprises a mobile communication device and said data circuit comprises an audio circuit, said audio circuit coupled to said first contact for connection of audio peripherals to said mobile communication device via said connector.

16. A mobile communication device comprising:

a power circuit;

a data circuit;

a connector for connecting external peripherals to said power and data circuits, said connector comprising:

a shared first contact selectively coupled either to said power circuit or to said data circuit; and a second contact for coupling to a ground of said mobile communication device; and a control circuit configured to sense a peripheral type based on whether a power peripheral or a data peripheral is connected to the connector, and further configured to connect said first contact either to said power circuit or to said data circuit based on the sensed peripheral type.

17. The mobile communication device of claim 16 wherein said connector comprises a barrel jack operative to receive a barrel plug, said first contact configured to connect with a first connection of said barrel plug and said second contact configured to connect with a second connection of said barrel plug.

18. The mobile communication device of claim 16 wherein said connector comprises an audio jack operative to receive an audio plug, said first contact configured to connect with a first segment of said audio plug and said second contact configured to connect with a second segment of said audio plug.

19. The mobile communication device of claim 16 further comprising a selection circuit configured to selectively couple said first contact either to of said power circuit or data circuit based on the sensed peripheral type.

20. The mobile communication device of claim 16 wherein said data circuit includes an audio circuit, said audio circuit coupled to said first contact for connection of audio peripherals to said mobile communication device via said connector.

21. The mobile communication device of claim 20 wherein said power circuit includes a power management circuit, said power management circuit coupled to said first contact for connection of power peripherals to said mobile communication device via said connector.

22. The mobile communication device of claim 16 wherein said data circuit comprises an audio circuit and said connector connects audio peripherals to said audio circuit.

23. A method of reducing the number of external connectors required for a personal electronic device that is intended to connect with both power and data peripherals, the method comprising:

providing an external shared function jack in said personal electronic device, said jack having at least one shared contact and one around contact, said jack operative to receive a common type of mating plug from both power and data peripherals;

sensing a peripheral type based on whether a power peripheral or a data peripheral is connected to the shared function jack;

selectively coupling said at least one shared contact of said jack either to the power circuit or the data circuit and based on the sensed peripheral type.

24. The method of claim 23 further comprising selectively coupling a second contact of said shared function jack to a ground of said power circuit or to said data circuit based on the sensed peripheral type.

25. The method of claim 23 wherein sensing the peripheral type comprises sensing a signal condition of one or more contacts of said shared function jack.

26. The method of claim 25 wherein sensing the signal condition comprises sensing one of a dc signal and an ac signal on one or more contacts of said jack.

27. The method of claim 25 wherein sensing the signal condition comprises sensing an electrical open or an electrical short on one or more contacts of said jack.

* * * * *

UNITED STATES PATENT AND TRADEMARK OFFICE

CERTIFICATE OF CORRECTION

PATENT NO. : 7,305,253 B2
APPLICATION NO. : 10/324441
DATED : December 4, 2007
INVENTOR(S) : Thomas D. Snyder et al.

It is certified that error appears in the above-identified patent and that said Letters Patent is hereby corrected as shown below:

Column 4, line 40: should read
-- power management circuit, such as a battery charging circuit[.] --

Column 5, line 25: should read
-- The present invention using a four-contact jack. The four [-] --

Please make the following corrections in the claims:

Column 7, line 67: should read
-- on the sensed peripheral type. --

Column 8, line 66: should read
-- couple said first contact either to ~~of~~ said power circuit or data --

Column 9, line 20: should read
-- shared contact and one ~~around~~ ground contact, said jack opera- --

Column 10, line 6: should read
-- ~~and~~ based on the sensed peripheral type. --

Signed and Sealed this

Thirteenth Day of May, 2008

JON W. DUDAS
*Director of the United States Patent and Trademark Office*